May 22, 1951  G. W. BUTT  2,554,400

PISTON RING AND PISTON THEREFOR

Filed April 11, 1949

Inventor
George Wright Butt
By Bailey, Stephens & Huettig
Attorneys

Patented May 22, 1951

2,554,400

UNITED STATES PATENT OFFICE 2,554,400

PISTON RING AND PISTON THEREFOR

George Wright Butt, Grimsby, England

Application April 11, 1949, Serial No. 86,623
In Great Britain March 18, 1948

3 Claims. (Cl. 309—22)

This invention relates to pistons and piston rings therefor for use in engines and compressors, especially for use in steam engines, in which breakage and excessive wear are often caused by "steam pack." It is an object of the invention to provide a piston and rings ensuring a better seal and longer life than heretofore.

According to the invention a piston ring has a depth in the radial sense approximately 2.25 times as great as the width in the axial sense, and is formed with an annular groove on each of those of its surfaces which are normal to its axis.

The invention also includes a piston having at least one such piston ring, wherein the lateral surfaces of the lands in contast with the grooved surfaces of the ring are themselves formed with corresponding grooves arranged to register with the grooves of the ring.

One of the lands may be provided with means such as a peg to engage a corresponding formation such as an aperture in the ring and prevent rotation of the ring relatively to the piston.

The piston may comprise a main portion and a junk ring portion, one formed with a spigot and the other with a recess arranged to permit assembly of the portions, and means to secure them together against relative axial movement. The piston may have at least two piston rings, in which event it may have at least one intermediate portion arranged to be secured between the main portion and the junk ring portion.

In such a piston, at least one of the pair of lateral surfaces of the piston between each pair of lands may be formed with a peripheral lip, and the piston ring may be formed with a corresponding rebate to receive said lip, the radial dimensions of the rebate and lip being selected to permit a predetermined radial expansion of the piston ring.

Embodiments of the invention will be described with reference to the accompanying drawings, in which.

Figure 1:
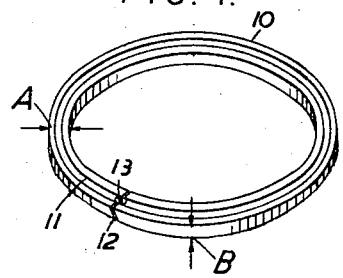
Figure 1 is a perspective view of a piston ring.
Figure 3:
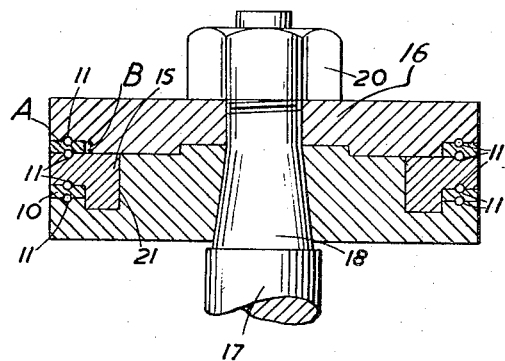
Figure 3 is a sectional view of the piston assembled.

Referring to Figures 1 and 3, a piston ring 10 is formed with its dimension A approximately 2.25 times its dimension B, and on each side of the ring a circumferential groove 11. The ring 10 has a scarf joint 12 and an aperture 13; a butt joint would, however, be suitable if desired.

Figure 2:
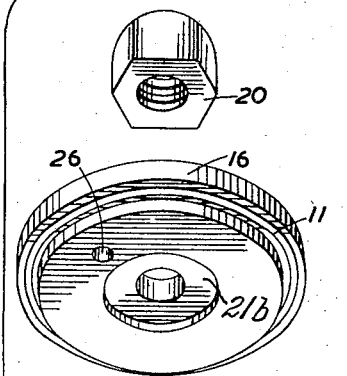
Figure 2 is an exploded perspective view of a two-ring piston for a steam engine.

Referring to Figures 2 and 3, the piston is arranged to have two such rings, and consists of a main portion 14, intermediate portion 15, and junk ring portion 16, all apertured centrally and arranged to be assembled on a piston rod 17 having a tapered portion 18, and a threaded portion 19 for engagement with a nut 20.

The main portion 14 has a spigot 21 for engagement with the central aperture of the intermediate portion 15, relative rotation between the parts being prevented by the engagement of a projection 22 on the spigot 21 with a notch 23 formed in the bore of the intermediate portion 15. The spigot 21 of the main portion 14 is provided with a peg 25 to engage a blind hole 26 in the junk ring portion and with a central spigot 21a to engage a corresponding central recess 21b in the junk ring for the prevention of relative movement and rotation. Each of the lateral surfaces of the lands constituted by the portions is formed with a groove 11 to register with the adjacent groove 11 formed in the associated piston ring, and one of each pair of such lateral surfaces is provided with a peg 24 to engage the aperture 13 of the adjacent piston ring and prevent rotation of the ring relatively to the piston.

When the piston is assembled as shown in Figure 3, and steam enters the cylinder, it enters the gaps at the joints 12 in the rings and finds its way into the grooves 11. There is therefore an equal pressure of steam all round the ring, and the ring is virtually floating under steam pressure. Moreover, the pressure tends to expand the ring towards the wall of the cylinder and so produce a good seal.

Figure 4:
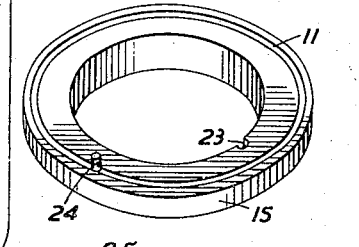
Figure 4 is a fragmentary sectional view of another form of piston and ring.
Figure 4:
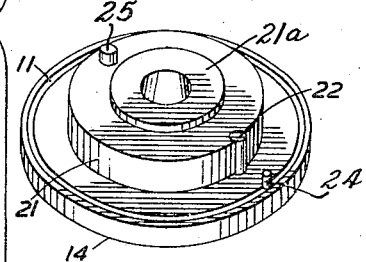
Figure 4:
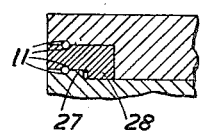

In another form of the invention, illustrated in Figure 4, the piston ring, in addition to having grooves 11, is formed with a projecting lip 28 accommodated beside a lip 27 on the adjacent piston land. A clearance between the lips 27, 28 of about three to six thousandths of an inch, depending on the size of the piston, is provided. In this way the expansion of the ring radially outwards may be controlled within predetermined limits. The piston is built up of two or more members assembled on an axial piston rod or the like substantially as hereinbefore described, so allowing the insertion of a ring between the lands.

If desired, the piston ring may be formed with a second lip 28 on the opposite face of the ring, in which event the lateral surface of the associated land would be formed with a lip corresponding with the lip 27.

Pistons according to the invention may have any required number of rings, a suitable number of intermediate portions being provided. Pistons and rings according to the invention are, moreover, applicable to reciprocating engines and compressors other than external combustion engines.

I claim:

1. A piston having a pair of lands defining a groove, a piston ring mounted in said groove, the surfaces of the lands adjacent said piston ring being formed each with annular groove and the corresponding faces of the piston ring being formed each with an annular groove registering with said first mentioned groove, and interengaging means on said piston and on the piston ring serving to prevent rotation of said piston ring relative to said lands; said piston comprising a main portion, a junk ring portion, and means for securing said portions together against relative axial movement, and said piston ring having a depth in the radial sense approximately 2.25 times as great as the width in the axial sense.

2. A piston having a pair of lands defining a groove, a piston ring mounted in said groove, the surfaces of the lands adjacent said piston ring being formed each with an annular groove and the corresponding faces of the piston ring being formed each with an annular groove registering with said first mentioned groove, and interengaging means on said piston and on said piston ring serving to prevent rotation of said piston ring relative to the lands; said piston comprising a main portion, a junk ring portion, one of said portions being formed with a spigot and the other portion with a recess to permit assembly of said portions, and means securing said portions together against relative axial movement, and said piston ring having a depth in the radial sense approximately 2.25 times as great as the width in the axial sense.

3. A piston as claimed in claim 1, further comprising at least one of the pair of surfaces of the piston between each pair of lands having a peripheral lip, said piston ring having a corresponding rebate to receive said lip, and the radial dimensions of the rebate and lip being selected to permit a predetermined radial expansion of the piston ring.

GEORGE WRIGHT BUTT.

REFERENCES CITED

The following references are of record in the file of this patent:

UNITED STATES PATENTS

| Number | Name | Date |
|---|---|---|
| 627,707 | Price | June 27, 1899 |
| 656,563 | Myers | Aug. 21, 1900 |
| 681,383 | Alison | Aug. 27, 1901 |
| 1,984,409 | Godron | Dec. 18, 1934 |
| 2,042,820 | Bax | June 2, 1936 |